INVENTOR.
WARREN A. BIRGE

BY

*Michael A. Sileo Jr.*

AGENT

INVENTOR.
WARREN A. BIRGE

> United States Patent Office 3,268,890
Patented August 23, 1966

3,268,890
SCANNING AND ELIMINATING MULTIPLE RE-
SPONSES IN A GRATING LOBE ANTENNA
ARRAY
Warren A. Birge, Winter Park, Fla., assignor to Martin-
Marietta Corporation, Middle River, Md., a corpora-
tion of Maryland
Filed May 1, 1963, Ser. No. 277,165
23 Claims. (Cl. 343—5)

This invention relates to electronic antenna scanning techniques for use in combination with a forward looking high resolution radar or radio navigation system wherein controlled grating lobe structures in the transmitting and receiving antenna patterns are generated so that the angular spacing between grating lobes of one pattern is incommensurate with the angular spacing between grating lobes of the other pattern, and more particularly to an antenna scanning techniques in which the product of the transmit and receive patterns reinforces only in the direction in which one transmit lobe coincides with one receive lobe for providing a single lobe product pattern, wherein by shifting the receive pattern with respect to the transmit pattern, the direction of reinforcement is caused to successively shift in discrete steps along the total sector to be scanned, and by shifting the transmit frequency of the system over a predetermined range of frequencies, the direction of reinforcement is caused to scan the sector between each successive reinforced product lobe position.

For purposes of simplicity of discussion, the novel antenna system and technique of the present invention will be described in connection with a mapping radar application. It is to be understood, of course, that the inventive concepts hereinafter disclosed may be incorporated in other well known radio and radio navigation applications without departing from the spirit and scope of this invention.

In view of the present day demand for radar systems which are aerodynamically compatible with installations on high performance aircraft, it is highly desirable that such radar systems provide high angular and range resolution characteristics, operate in real time, provide a forward looking capability, undergo minimum performance degradation under the most extreme atmospheric conditions in which it will be expected to operate, and have minimum size and maintenance requirements.

In an effort to achieve the foregoing ideal radar system characteristics, it has been discovered that compatible angular resolution problems are the most difficult to solve whereas compatible range resolution is more easily achieved. By way of example, an angular resolution of one milliradian against a distributed target represents a lateral resolution of sixty feet at a range of ten nautical miles, and with present known antenna systems can be achieved only with an excessively large antenna aperture. On the other hand, a radial or range resolution of sixty feet merely requires a pulse width of approximately 0.13 microsecond, which can readily be achieved with conventional well known techniques. Therefore, the prime problems facing antenna designers is that relating to angular resolution.

It is well known to those skilled in the antenna art that high resolution radar requirements for use in high speed radar carrying vehicles places unique and difficult design requirements upon the antenna system employed. By way of example, to provide coverage over a forward looking sector, the antenna pattern must be scanned to either side of the ground track, and to minimize picture jump, the scan rate must be sufficiently high so that the radar-carrying vehicle's motion between frames is a small fraction of the resolution element. As will be apparent, for vehicle speeds approaching Mach 1, frame rates of 25 to 30 cycles per second are required. Further, as the antenna pattern or horizontal beamwidth becomes narrower, the number of angular elements in a given sector increases and the dwell time per beamwidth is correspondingly reduced for a given frame rate. Although the transmitter PRF can be increased somewhat to compensate for this problem, a point is reached where average power limitations and second-time-around-echo (STAE) prevents a further increase in PRF. At this point, the picture contrast becomes an inverse function of the angular width of the sector being scanned. In addition to providing a high speed scan over a relatively large sector, it is also highly desirable for the scan format of the antenna to be flexible, so that longer dwell times over a narrow sector can be utilized to improve contrast and definition.

The foregoing necessary scan rates and scan format flexibility are difficult to achieve by mechanical means with a small antenna aperture. Clearly, with an aperture of the linear dimension required to obtain milliradian resolution (25 to 50 feet), mechanical steering is vertually impossible to achieve. As a result of the impracticability and impossibility of employing mechanical steering, antenna designers turned their efforts toward techniques employing inertia-less scan of large antenna apertures.

The prior art is replete with attempts to provide electronic scan antenna systems utilizing various inertia-less scan techniques. The most common and practical prior known attempts involve either frequency steering or phase steering techniques.

Frequency steering techniques generally employ the basic principle of changing the frequency of the R.F. energy propagating down a waveguide or coaxial cable so as to produce an adjustable phase taper across the antenna aperture. In the most basic frequency steering technique an array of radiating elements are predeterminedly positioned along a waveguide so that the electrical distance between the radiating elements is equal to the physical distance between the radiating elements whereupon a desired phase shift of the R.F. energy is produced as it propagates down the waveguide from one radiating element to the next. This desired phase shift is needed between each radiating element to steer the beam in a desired angular direction. Thus, at a particular center frequency the waveguide wavelength will be exactly that needed to produce a desired phase shift and at that frequency the beam will be steered in the desired direction. Accordingly, as the instantaneous frequency of the R.F. energy is varied (the condition under which space phase shift equals guide phase shift is also changed) the beam will steer in a new direction. Other frequency steering techniques employ either a zig-zag or a serpentine waveguide with the radiating elements positioned thereon so that the electrical distance between radiating elements (over which the R.F. energy must propagate between radiating elements) is greater than the physical spacing between the elements. These latter techniques permit an integral number of waveguide wavelengths to exist between radiating elements along with the desired phase shift for generating a particular phase taper and has the effect of reducing the percentage frequency change needed to steer the beam over a given change in beam direction. It has been determined that the larger the ratio of electrical length to physical length, the more sensitive the steering angle is with respect to the instantaneous frequency.

Each of the foregoing frequency steering techniques possess basic disadvantages. In the former technique the steering sensitivity is quite low, e.g., one to two percent frequency variation being required for each degree of beam steering. Although the latter technique can provide a satisfactory steering sensitivity when the ratio of electrical length to physical length is sufficiently large, it can be obtained only at the expense of very significant increases in volume, weight, and power loss.

The phase steering techniques generally employ an independently controlled phase shifter at each radiating element to produce the desired phase taper across the aperture. In the most basic phase steering techniques, an array of radiating elements are predeterminedly positioned along a waveguide with each element having an independently controlled phase shifter to produce the desired phase taper across the aperture. The phase shifters are generally microwave ferrites or varactors. Although this type of system provides versatility and fixed frequency operation, an excessively high number of phase shifters are required for a large antenna. In addition, calibration, linearity and temperature compensation present serious operational problems.

The present invention addresses itself primarily toward solving the heretofore incompatible problems of achieving high angular resolution while maintaining aerodynamic compatibility. In particular, this invention provides a method for greatly reducing the number of active elements required to implement a large antenna array. In addition, the technique of the present invention uniquely permits electronic steering of large antenna arrays operating at high microwave frequencies without extreme power losses or complex mechanization heretofore required in prior known electronic steering techniques.

In accordance with this invention a grating lobe antenna is utilized, for use in or on long thin structures, such as the wings of an aircraft or missile. Inasmuch as a grating lobe antenna utilizes a much smaller number of elements over a given length than does a conventional antenna, such antennas are often preferred by those concerned with achieving high angular resolution by lightweight, aerodynamically compatible design. The present invention utilizes a transmit array and a receive array disposed in essentially parallel relationship, with the elements being interdigitated, if such be desired. For example, a typical array may employ 30 transmit elements and 28 receive elements, which results in incommensurate spacing of transmit and receive lobes.

In order to achieve electronic steering, I employ the well-known technique of frequency variation. The use of a small number of antenna elements across a large antenna aperture produces numerous grating lobes in each antenna pattern, and by proper selection of element spacing of one array with respect to the other I achieve coincidence or reinforcement between only one transmitting lobe and one receiving lobe under a given set of transmit and receive conditions hereinafter described.

More particularly, through the use of two independent frequency steering mechanisms, one for transmit and the other for receive, I bring out an interrelation that eliminates the inherent grating lobe ambiguity and provides capability for scanning the resolved lobe across a large angular sector. By transmitting a varying frequency I cause the several transmit lobes to move in an angular fashion so as to achieve a degree of scan by virtue of the product lobe formed by the relationship with the receive antenna lobes in effect being caused to move across a sector.

Realizing that the location of a target in the path of any one lobe cannot be ascertained with certainty because of grating lobe ambiguity, I therefore provide means in the receiver, such as in the form of a local oscillator, for varying the resulting product lobe that is created as a result of the incommensurate spacing of transmit and receive lobes. This is to say, because the arrangement employed in accordance with this invention includes an unequal number of transmit and receive lobes, I can obtain a successive reinforcement of a lobe of one pattern with the lobe of another pattern by appropriate change in the frequency steering mechanism of the receive array.

In the practice of this invention, a selected sector can be scanned in a very effective manner, despite the fact that the use of a grating lobe structure in both the transmit and receive patterns causes antenna lobes to be pointing in many directions across the sector. In other words, by selectively aligning the particular transmit and receive lobes in a particular manner, the angular ambiguities due to the presence of many lobes is eliminated.

By adjustment of the receive array steering mechanism, I first bring a selected lobe produced by the receive array into coincidence with the corresponding lobe produced by the transmit array. Typically the first pair of lobes brought into alignment would be those directed toward the left edge of the sector to be scanned. The steering mechanism of both the transmit and receive arrays are then varied in an interrelated manner so as to steer the reinforced lobes from their initial position to a position several degrees away, in this instance to the right.

After the aligned lobes have been steered several degrees to the limit of their angular excursion, I then cause the initial pair of lobes to be moved out of coincidence and a new set of lobes to be brought into coincidence, this being accomplished by returning the transmit steering mechanism to its starting frequency and adjusting the receiving steering mechanism to a new value with respect to the transmit mechanism. The second pair of lobes can thus be brought into cinicidence in the same direction as the last location of the previously aligned lobes, thus insuring that no gaps appear in the scan pattern. By variation of the transmit and receive steering mechanism in a related manner I now cause the second pair of aligned lobes to steer several degrees to the right thereby continuing the scan pattern. By successive repetitions, pairs of lobes are sequentially brought into alignment and steered across a single angular sector, with the overall result being an apparent motion of a single unambiguous lobe across the entire scan sector.

My invention also advantageously lends itself to scanning over a limited portion of the sector in order to ascertain the presence or absence of a target in a suspicious area. This latter may be accomplished in the practice of this invention by continuously maintaining only one pair of lobes in alignment and causing these lobes to be oscillated back and forth by proper variation of transmit and receive steering mechanisms.

As will be apparent, both the regular scan and the selected scan are each accomplished automatically by the utilization of a programmer which controls the relative action of the transmit and receive steering mechanisms.

In accordance with one embodiment of the present invention, a plurality of transmitting elements are interdigitated with a plurality of receiving elements and in such manner so that the axis of the transmitting elements is co-linear with the axis of the receiving elements. The physical distance between any two transmitting elements and the physical distance between any two receiving elements are specifically chosen so as to provide an angular separation or sector between any two adjacent receiving pattern grating lobes that is one main lobe null beamwidth different than the angular separation or sector between any two adjacent transmitting pattern grating lobes. The physical distance between and electrical characteristics of the transmitting and receiving elements are such as to generate controlled grating lobe structures in the transmitting and receiving antenna patterns wherein the spacing between lobes of one pattern are incommensurate with the spacing between lobes of the other pattern. Therefore, the product lobe pattern of the transmit and receiving patterns, which represents the overall or "round trip" effective pattern, will reinforce only in the direction in which one of the transmitting lobes coincides with one of the receiving lobes so as to provide a single lobe product pattern. Thus, by shifting one pattern relative to the other, the direction of reinforcement will be successively moved in discrete steps along the total desired sector to be scanned. A transmit frequency generator, such as a hydraulically tunable magnetron, is employed in the transmitter section of the system to obtain a rapidly variable transmit frequency for steering the transmitted beam over any sector between successive reinforced product lobe positions. The instantaneous transmit frequency is controlled by a voltage signal applied to the transmit frequency generator and derived from a scan program controller. At the beginning of a scan, the transmit frequency, and a first local oscillator frequency are established at a frequency appropriate to the sector to be scanned. The first L.O. frequency is also controlled by a voltage level developed by the Scan Program Controller. A backward-wave-oscillator may be employed as the first L.O. though other well known oscillators will operate as well. The transmit frequency is then swept over a predetermined range of frequencies which are sufficient to cover the angular distance or sector between successive reinforced product lobe positions. That is to say, during transmit frequency sweeping, the frequency difference between the transmit frequency and first L.O. frequency is held substantially constant while frequency variations of the transmit frequency cause the reinforced product lobe to sweep out the sector between successive reinforced product lobe positions. The first L.O. is then stepped to a new frequency, thereby causing a second transmit grating lobe to coincide with a second receiving grating lobe so as to provide a second reinforced product lobe position which is displaced a predetermined angular distance from the first reinforced product lobe position. The frequency difference between the new first L.O. frequency and the transmit frequency is again maintained substantially constant while variations of the transmit frequency cause the second product lobe to scan the sector between the first and second reinforced product lobe positions. A second local oscillator is preferably provided for establishing the first L.O. frequency at a value near the transmit frequency and for controlling and maintaining the variations of the first L.O. frequency in synchronism with the transmit frequency so as to maintain a constant difference frequency during the synchronized scan of the transmit frequency relative to the synchronized stepping of the first L.O. frequency. A new sector to be scanned is conveniently selected by merely shifting the first L.O. frequency so as to establish a new difference frequency. The second L.O. is coarsely controlled by the Scan Program Controller and is used to develop and translate the difference frequency to a second intermediate frequency. The second I.F. is amplified by an intermediate frequency amplifier. An automatic frequency control loop is taken from the I.F. Amplifier and fed back to the second L.O. for accurately centering the second I.F. translated signal.

It is accordingly a primary object of the present invention to provide an antenna scanning system for use in combination with forward looking high resolution radar networks which generates controlled grating lobe structures in the transmitting and receiving antenna patterns wherein the angular spacing between lobes of one pattern are incommensurate with the angular spacing between lobes of the other pattern so that the product of the two patterns will reinforce only in the direction in which one of the transmitting lobes coincides with one of the receiving lobes so as to provide a single lobe product pattern.

It is another object of the present invention to provide an antenna scanning system of the type described wherein the shifting of the transmitting and receiving antenna patterns relative to each other permits steering of the transmitted beam over any sector between successive reinforced product lobe positions.

It is another object of the present invention to provide an antenna scanning system of the type described wherein the product lobe pattern of the transmit and receiving patterns are reinforced only in the direction in which one of the transmitting lobes coincides with one of the receiving lobes so as to provide a single lobe product pattern, and the direction of reinforcement of the transmit and receive patterns is moved in discrete steps along the total sector being scanned by varying local oscillator frequency, and the reinforced product lobe is caused to scan the sector between each successive reinforced product lobe position by varying transmit frequency.

It is another object of the present invention to provide an antenna scanning system of the type described wherein a plurality of transmitting elements are interdigitated with a plurality of receiving elements with the physical distance between an electrical characteristic of the transmitting and receiving elements, respectively, specifically chosen so that the angular separation between any two adjacent receiving pattern grating lobes is one main lobe null beamwidth different than the angular separation between any two adjacent transmitting pattern grating lobes so that the product pattern of the transmitting and receiving patterns is reinforced only in the direction in which one of the transmitting lobes coincides with one of the receiving lobes so as to provide a single lobe product pattern.

It is another object of the present invention to provide an antenna scanning system for radar and radio navigation networks which has high angular and range resolution, operates in real time, provides forward looking capability, has minimum performance degradation under extreme atmospheric conditions, and has minimum size and maintenance requirements.

It is another object of the present invention to provide an antenna scanning system for radar and radio navigation networks which is simple in construction, economical to manufacture, and highly reliable in performing the intended functions and achieving the desired objects.

These and further objects and advantages of the present invention will become more apparent upon reference to the following description and claims and the appended drawings wherein:

For purposes of clarity and understanding, corresponding elements and dimensions in the several figures will be designated with similar reference characters.

Figure 1:
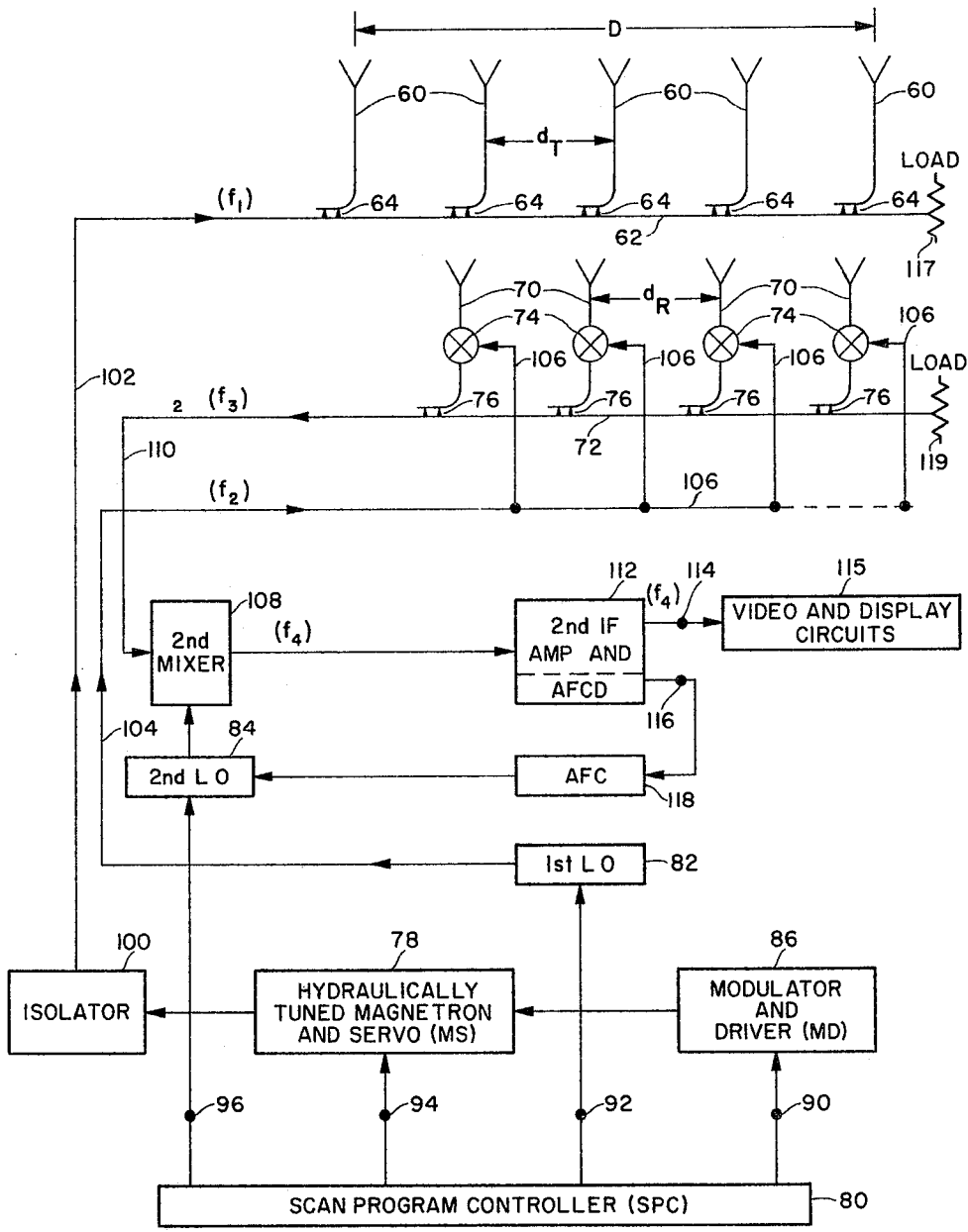
FIGURE 1 depicts a block diagram of one embodiment of the present invention.

*Detailed description—FIGURE 1*

Referring now to FIGURE 1, there is shown a block diagram of a basic embodiment of the present invention. The transmitting elements 60 are each connected to a waveguide 62 by a directional coupler 64 and are separated by a distance $d_T$. The receiving elements 70 are each connected to a waveguide 72 through a mixer 74 and directional coupler 76 and are separated by a distance $d_R$. As will be discussed more fully in detail regarding the mathematical analysis of the transmitting and receiving arrays of FIGURES 6 and 7, the distances $d_T$ and $d_R$ are specially selected so as to provide a separation $\theta_{SR}$ (see FIGURE 2) between the receiving pattern grating lobes that is one null beamwidth less than the separation $\theta_{ST}$ (see FIGURE 3) between the transmitting pattern grating lobes. It will be noted that the antenna arrays of this embodiment constitute what is commonly referred to as a grating lobe antenna.

Figure 4:
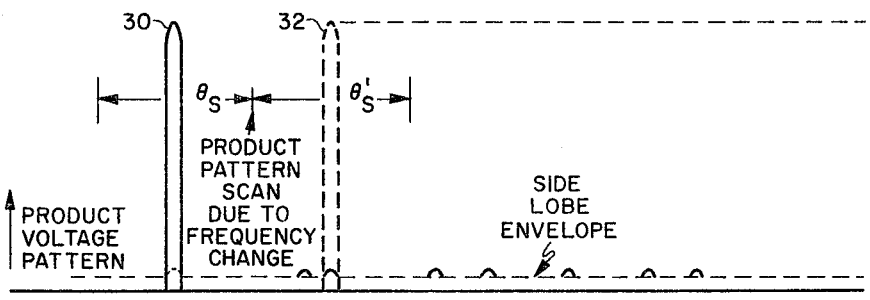
Figure 5:
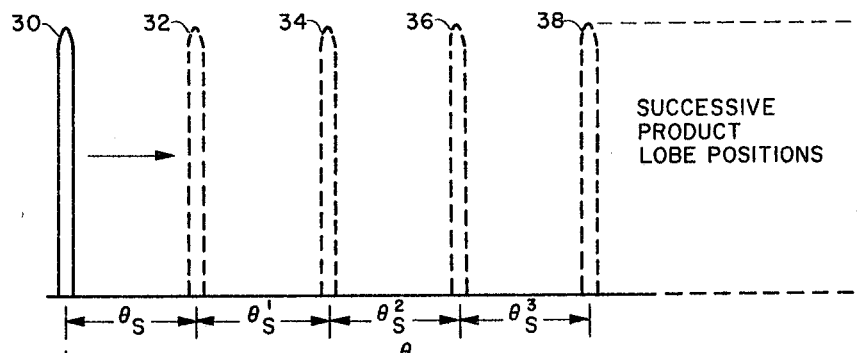
FIGURE 5 is a Cartesian chart of the product lobe pattern with relative power plotted as the ordinate and the angle off boresight plotted as the abscissa and showing the product lobe when in its reference position in solid lines and the product lobe when in successive positions in dotted lines.

A hydraulically tunable magnetron and servo (MS) 78 or any other variable frequency power source is provided for generating a controlled, rapidly variable, transmit frequency $f_1$ sufficient to steer the transmit beam over an interval $\theta_s$ (see FIGURES 4 and 5). A scan program controller (SPC) 80 is provided for controlling the MS 78, first local oscillator (1st L.O.) 82, second local oscillator (2nd L.O.) 84 and modulator-driver (MD) 86. The SPC 80 has four output terminals, 90, 92, 94 and 96. SPC 80 delivers a timing pulse to the MD 86 through terminal 90. This timing pulse controls the application of a high voltage pulse to the MS 78 for developing the frequency $f_1$. A voltage level signal from SPC 80 is applied to the 1st L.O. 82 through terminal 92 for establishing the frequency $f_2$ of the 1st L.O. 82. A second voltage level signal from SPC 80 is applied to the servo section of the MS 78 via the terminal 94 for controlling the transmit frequency $f_1$ of the magnetron section of the MS 78. Lastly, a third voltage level signal from SPC 80 is delivered to the 2nd L.O. 84 via the terminal 96 for establishing the frequency of the 2nd L.O. 84. The transmit frequency $f_1$ generated by the MS 78 is applied to the transmitting elements 60 via the isolator 100, conductor 102, waveguide 62 and directional couplers 64. The isolator 100 is connected between the waveguide 62 and MS 78 for isolating the magnetron section of the MS 78 from the variable impedance presented by the transmitting section (i.e., elements 60, waveguide 62 and couplers 64) as the transmit frequency $f_1$ varies. Any well known isolator may be used so long as it compensates for the inherent sensitivity of a magnetron to its load. It is to be understood that if any other well known variable frequency generator is substituted for the MS 78, the isolator may not be necessary and may, therefore, be excluded from the circuit without departing from the spirit and scope of the present invention.

The frequency $f_2$ generated by the 1st L.O. 82 is applied to each of the mixers 74 via conductors 104 and 106. The frequency $f_2$, generated by the 1st L.O. 82, is mixed with reflections of the transmit frequency $f_1$, which are received by the receiving elements 70 and also applied to each of the mixers 74, so as to develop a first intermediate frequency (1st I.F.). The 1st I.F. $f_3$ is coupled to the second (2nd) mixer 108 via couplers 76, waveguide 72 and conductor 110. The frequency generated by the 2nd L.O. 84 is also applied to the 2nd mixer 108, which is tuned to pass a second intermediate frequency (2nd I.F.). The 2nd I.F. $f_4$ developed by the 2nd mixer 108 is applied to the second intermediate frequency amplifier and automatic frequency control discriminator (2nd I.F. Amplifier and AFCD) circuit 112. The amplified 2nd I.F. $f_4$ may then be coupled to appropriate video and display circuits 115 via output terminal 114. The 2nd I.F. Amp and AFCD circuit 112 develops a second output signal which is delivered via output terminal 116 to the automatic frequency control (AFC) circuit 118. The output signal of the AFC circuit 118 is then delivered to the 2nd L.O. 84 wherein it is used to synchronize and fine control the frequency generated by the 2nd L.O. 84. The circuit which includes the AFCD section of the 2nd I.F. Amp and AFCD circuit 112, the AFC circuit 118, and 2nd L.O. 84 constitute what is commonly referred to as the AFC "loop." It should be noted, that the waveguides 62 and 72 are respectively terminated by conventional resistive loads 117 and 119.

It should be further noted, that in the embodiment of FIGURE 1, a portion of the AFC circuitry is made a part of the 2nd I.F. Amp and AFCD circuit 112 while the remaining AFC circuitry is independent of the 2nd I.F. Amp and AFCD 112. It will be apparent therefore that other well known AFC loop circuits may be readily substituted without departing from the spirit and scope of the present invention. In addition, well known voltage-controlled frequency type oscillators, such as, backward wave oscillators, may be incorporated as the 1st and 2nd local oscillators if desired.

Figure 6:
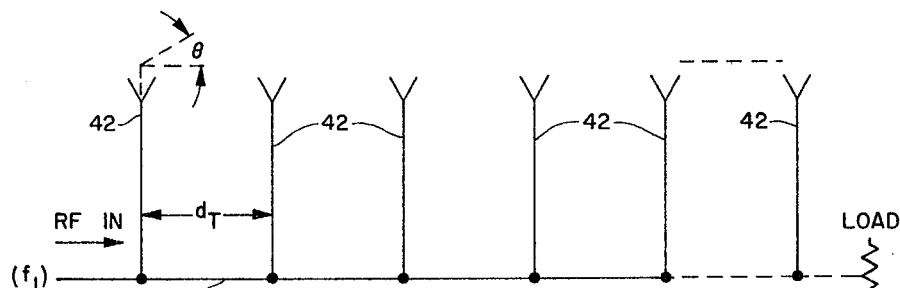
FIGURE 6 depicts a schematic of the transmitting section of the present invention showing the transmitting elements and waveguide transmission line.
Figure 7:
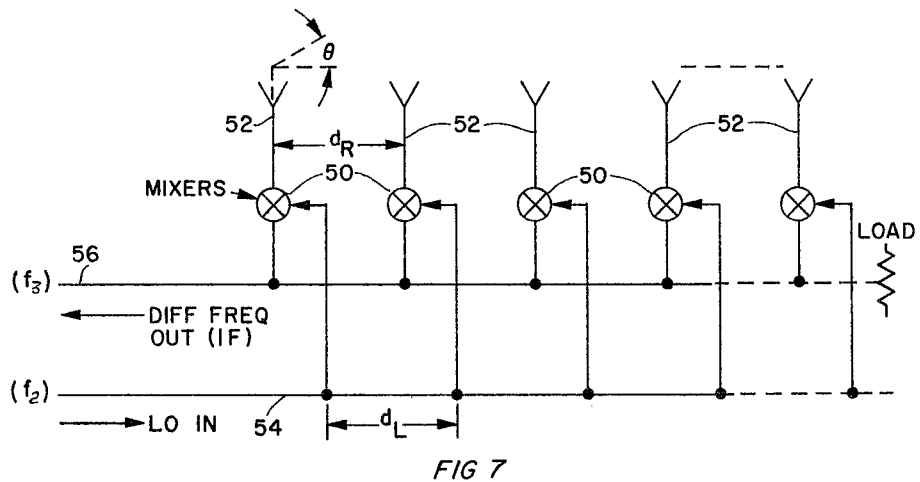
FIGURE 7 depicts a schematic of the receiving section of the present invention showing the receiving elements, waveguide transmission line and mixers.

For purposes of clarity and understanding, a detailed description of FIGURES 2–5 and a mathematical analysis of the transmitter of FIGURE 6 and receiver of FIGURE 7 will be presented before the mode of operation of the block diagram of FIGURE 1. The purpose for this form of presentation will become more apparent hereinafter, and it will suffice to now state that a clearer understanding of the scientific principles involved in the operation of the embodiments of FIGURES 1 and 8 will be possible when the operation of the transmitting and receiving arrays of FIGURES 6 and 7 in conjunction with the grating lobe structures of FIGURES 2–5 are better understood.

*Detailed description—FIGURES 2–5*

Figure 2:
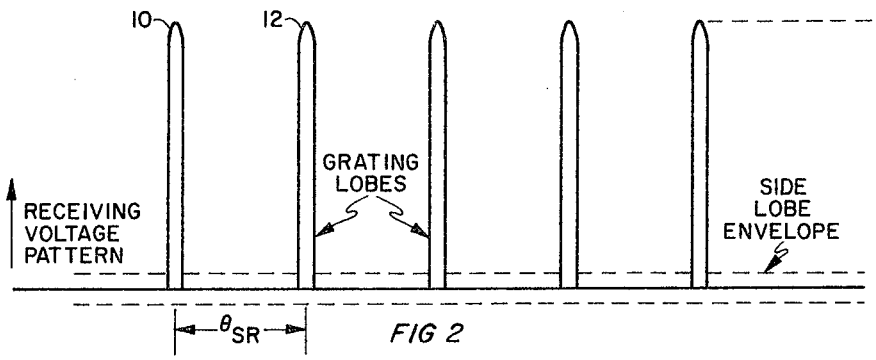
FIGURES 2–4 are Cartesian charts of receiving, transmitting and product lobe patterns, respectively, with relative power plotted as the ordinate and the angle off boresight plotted as the abscissa.
Figure 3:
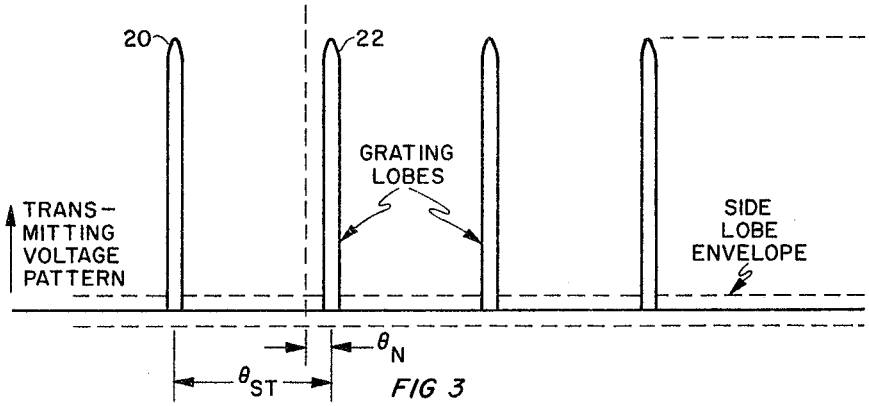

Referring now in detail to FIGURES 2 to 4, there are shown Cartesian charts of exemplary receiving, transmitting and product lobe patterns, respectively, of the transmitting and receiving grating lobe antennas of the present invention, with relative power plotted as the ordinate and the angle off boresight, i.e., center wavelength, plotted as the abscissa. FIGURES 2 and 3 show the grating lobe structures established in the receiving and transmitting antenna patterns, respectively, and FIGURE 4 shows the product of the receiving and transmitting patterns which is a single lobe, unambiguous structure.

With regard to FIGURES 2 and 3, it will be noted that at points where the main lobe of one pattern coincides with the side lobes of the other, the side lobe level of the product pattern (FIGURE 4) is increased. However, since this effect occurs at only one point in each $\theta_s$ interval, the increase in integrated side lobe level is not significant. It will be further noted, respecting FIGURES 2–4, that the lobe spacing $\theta_{ST}$ of the transmitting pattern is one main lobe null-beamwidth $\theta_N$ larger than that of the lobe spacing $\theta_S$ of the receiving pattern. That is to say, the lobe spacing of the transmitting pattern is equal to the lobe spacing of the receiving pattern plus one main lobe null-beamwidth, i.e.;

$$\theta_{ST} = \theta_{SR} + \theta_N$$

In the examples shown in FIGURES 2–4, the patterns are registered so that the receiving lobe 10 coincides with the transmitting lobe 20. Accordingly, by varying the transmit frequency $f_1$ and the local oscillator frequency $f_2$ the product lobe 30 may be moved continuously so as to sweep out a portion or sector $\theta_s$ (see FIGURE 4). In order to scan the next adjacent sector $\theta_s^1$, the transmit frequency $f_1$ must be returned to a reference value and the receiving pattern shifted to the right (relative to the transmitting pattern) by an amount $\theta_N$. As will be discussed in more detail hereinafter, the receiving pattern is caused to shift by varying the frequency of the first local oscillator. As will be seen with reference to FIGURE 5 in view of FIGURE 2–4, the shifting of the receiving pattern relative to the transmitting pattern enables the receiving lobe 12 to coincide with the transmitting lobe 22, thereby shifting the product lobe 30 one sector ($\theta_s$) to the right to a new position represented by the product lobe 32, shown in dotted lines. Subsequent shifting of the receiving pattern causes the product lobe to move successively one sector ($\theta_s^1 \ldots \theta_s^N$) to new positions represented by product lobes 32–38 (see FIGURE 5). Again, frequency steering, i.e., varying the transmit and local oscillator frequencies, may be used to move the product lobe 32 continuously over the second sector $\theta_s^1$. The foregoing procedure is accordingly repeated so that successive sectors ($\theta_s^2, \theta_s^3 \ldots \theta_s^N$) may be scanned.

It should be noted at this point that since frequency steering need take place only over the small sector $\theta_s$, the well known In-Line Waveguide Array may be utilized rather than the well known Serpantine Waveguide Array. For example, by employing a 25 foot aperture, it has been determined that by utilizing the unique technique of the present invention, the waveguide length required is desirably reduced from approximately 350 feet to 25 feet, with the advantageous reduction in one-way waveguide loss from approximately 30 db to less than 2 db.

It should also be noted at this point, that since the multi-lobe pattern of the present invention radiates in several directions simultaneously, rather than concentrating all of the transmitted energy into a single lobe, the power gain and receiving aperture are reduced from that of a completely filled in array of the same length by a factor approximately equal to the number of lobes contained within the 3 db beamwidth of the individual antenna elements. Also, for example, if 4 degree lobe spacing and 60 degree sector coverage are considered, the gain reduction is approximately 11 db. Although an 11 db gain reduction numerically appears to be a substantial loss, it is much less than is involved in prior known Waveguide Arrays. In addition, when the relative simplicity with which the Waveguide Array of the present invention can be mechanized is compared with the mechanization of a conventional Phase-Steered Waveguide Array, this 11 db gain reduction is reasonably warranted and permissive. It is, however, possible to substantially offset this 11db gain reduction by either of two alternative procedures.

The first procedure involves the use of a comb rather than a single line local oscillator spectrum. This expedient generates a set of receiving patterns, each lobe of which is in coincidence with a lobe of the transmitting pattern. Accordingly, through the use of multiple receivers, energy may be received simultaneously from all directions in which it was transmitted.

The second procedure for loss recovery involves the expedient of stepping the receive pattern while the transmitted signal is propagating over the target space. By this latter procedure, receiving and transmitting lobes are successively brought into coincidence at different pointing angles, and a series of returns from each direction in which energy was propagated is obtained.

*Mathematical analysis—FIGURE 6 transmitter*

Referring now to FIGURE 6, there is shown an exemplary schematic of grating lobe transmitting antenna which may be used in the antenna system of the present invention. In this exemplary embodiment of the transmitting section, the transmitting elements may consist of either slots milled in the wall of the waveguide 40 or directional couplers (not shown) connected to radiating elements 42. Any well known method of connecting the radiating element 42 to the waveguide 40 may be used without departing from the spirit and scope of the present invention. If the slot locations or coupler values or other means for connecting the radiating elements, are chosen to give a uniform amplitude taper, it can be shown that the horizontal-plane (far field) voltage pattern of the transmitting antenna is given by the following equation:

(1) $$f_T(\theta_1 \lambda_1) = \frac{\sin \frac{No}{2}(\phi+\alpha)}{\sin \frac{1}{2}(\phi+\alpha)}$$

where, $$\phi = \frac{2\pi d_T}{\lambda_1} \sin \theta$$

$$\alpha = \frac{2\pi d_T}{\lambda_{IG}}$$

$\lambda_1$ = freespace wavelength (*fswl*) at transmitter frequency ($f_1$)

$\lambda_{IG}$ = guide wavelength (*gwl*) at transmitter frequency ($f_1$)

A major lobe will occur whenever the denominator of Equation 1 goes to zero, i.e., whenever, $$\tfrac{1}{2}(\phi+\alpha) = K\pi$$

where $$K = \ldots -1, 0, 1, \ldots \text{ etc.}$$

or when, (2) $$\phi + \alpha = \left(2\pi \frac{d_T}{\lambda 1} \sin\theta \cdot \frac{dT}{\lambda_{IG}}\right) = K2\pi$$

For purposes of clarity and understanding a center wavelength ($\lambda_1°$) is defined as the point at which one major lobe is directed precisely on boresight.

If $\lambda_{IG}°$ represents the corresponding guide wavelength, the transmitter element spacing will be such that, (3) $$\frac{d_T}{\lambda_{IG}°} = N_1 = \text{integer}$$

By substituting Equation 3 in Equation 2, Equation 2 can be rewritten at the center frequency as, $$\frac{d_T}{\lambda_1°} \sin \theta + N_1 = K$$

(4) $$\sin \theta = (K - N_1)\frac{\lambda_1°}{d_T}$$

Once $N_1$ is determined, the substitution of various integers into Equation 4 for K will produce the center frequency pointing direction of each major transmitting lobe. The transmitting lobes may be identified explicitly by noting that the boresight lobe occurs when, $$K = N_1 \text{ (i.e.—} \sin \theta = 0)$$

and the first lobe clockwise from boresight occurs when, $$K = N_1 + 1$$

and the first lobe counterclockwise from boresight occurs when, $$K = N_1 - 1 \ldots \text{ etc.}$$

If a number $L_j$ is assigned to each lobe ($j = \ldots -z, -1, 0, 1, 2, \ldots$) with $L_0$ denoting the boresight lobe, K may be written in terms of $N_1$ and $L_j$ as follows:

(5) $$K = N_1 + L_j$$

Substituting Equation 5 into Equation 4, the center frequency pointing angle of the *j*th lobe becomes, (6) $$\sin \theta_j = L_j \frac{\lambda_1}{d_T}$$

To determine the pointing direction of the *j*th lobe at any frequency, it is necessary to replace $d_T$ by $N_1 \lambda_{IG}$ and K by $N_1 + L_j$ in Equation 2. Then, $$N_1 \lambda_{IG}° \left(\frac{1}{\lambda_1} \sin \theta_j + \frac{1}{\lambda_{IG}}\right) N_1 + L_j$$

Therefore, (7) $$\sin \theta_{JT} = \frac{\lambda 1}{\lambda_{IG}°}\left(1 + \frac{L_j}{N_1}\right) - \frac{\lambda_1}{\lambda_{IG}}$$

*Mathematical analysis—FIGURE 7 receiver*

Referring now to FIGURE 7, there is shown an exemplary schematic of a grating lobe receiving antenna which may be used in the antenna system of the present invention. The mechanization of the receiving section is slightly different than the transmitting section since it is necessary to shift the receive pattern slightly with respect to the transmitting pattern. Accordingly, a shifting technique other than shifting of transmitter frequency must be employed. This additional shifting requirement is completed by physically connecting mixers 50 at the port of each receiving element 52 which act to introduce a phase taper onto the incoming signal. The phase taper on the incoming signal is caused by phase retardation of the local oscillator frequency $f_2$ as it propagates down the local oscillator bus 54. Also, an additional phase taper is introduced by the variable difference frequency $f_3$ propagating down the output bus 56. Accordingly, by varying the local oscillator frequency $f_3$, the receiving pattern may be steered relative to the transmitting pattern.

It should be noted at this point that due to the incoherent addition of noise at each port compared with the coherent addition of signal, no additional mixer noise is introduced with this plural mixer technique than would be with a single mixer technique.

The voltage pattern of the receiving antenna is given by the following equation:

(8)
$$f_R(\theta, \lambda_1, \lambda_2, \lambda_3) = \frac{\sin \frac{N}{2}(\phi+\beta+\alpha)}{\sin \frac{1}{2}(\phi+\beta+\alpha)}$$

where, $$\phi = \frac{2\pi d_R}{\lambda_1} \sin \theta$$

$$\beta = \frac{2\pi d_R}{\lambda_{2G}}$$

$$\alpha = \frac{2\pi d_L}{\lambda_{3G}}$$

$\lambda_1$ = freespace wavelength (*fswl*) at transmitter frequency ($f_1$)
$\lambda_{2G}$ = guide wavelength (*gwl*) at difference frequency ($f_3$)
$\lambda_{3G}$ = guide wavelength (*gwl*) at local oscillator frequency ($f_2$)

The steering sensitivity of the receiving array with respect to both changes in transmitter frequency $f_1$ and changes in local oscillator frequency ($f_2$) may be mathematically determined as follows:

As above mentioned with regard to the transmitting array, major lobes of the receiving pattern will occur whenever the denominator of Equation 8 goes to zero, i.e., whenever, $$\tfrac{1}{2}(\phi,\beta,\alpha) = K^1 \pi$$

where,
$$K^1 = \ldots -1, 0, 1, \ldots \text{ etc.}$$

or when, (9)
$$\frac{d_R}{\lambda_1} \sin \theta + \frac{d_R}{\lambda_{2G}} + \frac{d_L}{\lambda_{3G}} = K^1$$

The center wavelengths, $\lambda°_{2G}$ and $\lambda°_{3G}$ and the distance $d_1$ are chosen so that,

(10)
$$\frac{d_R}{\lambda°_{2G}} = N_2 = \text{integer}$$

and, (10¹)
$$\frac{d_L}{\lambda°_{3G}} = N_3 = \text{integer}$$

When all three frequencies $f_1$, $f_2$ and $f_3$, are at their center values, Equations 10 and 10¹ can be substituted in Equation 9 and Equation 9 can be rewritten as, $$\frac{d_R}{\lambda°_1} \sin \theta + N_2 + N_3 = K^1$$

or,

(11)
$$\sin \theta = (K^1 - N_2 - N_3) \frac{\lambda°_1}{d_R}$$

Accordingly, Equation 11 describes the pointing directions of the receiving lobes at the systems center frequency.

The constant, $K^1$, may now be written in terms of the number $L_j$ since,

(12)
$$K^1 = N_2 + N_3 + L_j$$

Hence, the center frequency pointing direction of the receive lobes becomes,

(13)
$$\sin \theta_{jR} = L_j \frac{\lambda°_1}{d_R}$$

The pointing directions for any combination of frequencies may be determined by substituting Equations 10, 10¹ and 12 into Equation 9. Thus, $$\frac{d_R}{\lambda_1} \sin \theta + N_2 \frac{\lambda°_{2G}}{\lambda_{2G}} + N_3 \frac{\lambda°_{3G}}{\lambda_{3G}} = N_2 + N_3 + L_j$$

or

(14)
$$\sin \theta_{jR} = \frac{\lambda_1}{d_R}\left[ N_2\left(1 - \frac{\lambda°_{2G}}{\lambda_{2G}}\right) + N_3\left(1 - \frac{\lambda°_{3G}}{\lambda_{3G}}\right) + L_j \right]$$

In order for the sector scan of the product lobe to take place, the lobe separation of the receive pattern must be less, by at least one null beamwidth, than the lobe separation of the transmit pattern. On boresight, at center frequency, the lobe separation of the transmit pattern is found from Equation 6 to be

(15)
$$\theta_{ST} = \frac{\lambda°_1}{d_T}$$

Similarly, on boresight, at center frequency, the lobe separation of the receive pattern is found from Equation 13 to be,

(16)
$$\theta_{ST} = \frac{\lambda°_1}{d_R}$$

Letting $N_0$ equal the total number of transmitting elements, the null beamwidth of the transmitting pattern is, from Equation 1,

(17)
$$\theta_N = \frac{2\lambda°_1}{N_0 d_R}$$

To satisfy the sector scan requirement, it is necessary that the system have, at center frequency,

(18)
$$\theta_{SR} \leq \theta_{ST} - \theta_N$$

or (18¹)
$$\frac{\lambda°_1}{d_R} \leq \frac{\lambda°_1}{d_T} - \frac{2\lambda°_1}{N_0 d_R}$$

This results in the following basic relation between the transmit and receive element spacing:

(19)
$$\frac{1}{d_T} \leq \frac{1}{d_R}\left(1 + \frac{2}{N_0}\right)$$

or (19¹)
$$d_T \leq \frac{d_R}{\left(1 + \frac{2}{N_0}\right)}$$

Substituting Equation 19¹ for the term $d_T$ in Equation 3 we get,

(20)
$$N_1 = \frac{d_R}{\lambda°_{1G}\left(1 + \frac{2}{N_0}\right)}$$

Then substituting Equation 20 for the term $N_1$ in Equation 7 we get,

(21)
$$\sin \theta_{JT} = 1\left(\frac{1}{\lambda°_{1G}} - \frac{1}{\lambda_{1G}}\right) + \frac{\lambda_1}{d_R}\left(1 + \frac{2}{N_0}\right)L_j$$

Finally, the Equation 14 may be rewritten by substitution of the terms $N_2$ and $N_3$ from Equations 10 and 11, respectively.

(22)
$$\sin \theta_{JR} = \lambda_1\left(\frac{1}{\lambda°_{2G}} - \frac{1}{\lambda_{2G}}\right) + \frac{d_L}{d_R}\left(\frac{1}{\lambda°_{3G}} - \frac{1}{\lambda_{3G}}\right) + \frac{\lambda_1}{d_R}L_j$$

Equations 21 and 22 represent complete general expressions for the pointing angles of the *j*th lobes of the transmit and receive arrays, respectively, in terms of the receive element spacing $d_R$, the number of transmitting elements $N_0$, and the transmit, difference and local oscillator wavelengths, $\lambda_1$, $\lambda_2$, and $\lambda_3$, respectively. Thus, any specific mechanization of the grating lobe antennas of the present invention may be mathematically determined by utilization of Equations 21 and 22, above. However, any other specific antenna system may be utilized without departing from the spirit and scope of the present invention providing such other system generates transmitting and receiving grating lobe patterns in which the space between lobes of one pattern is incommensurate with the space between lobes of the other pattern.

It should be noted, that a receiving lobe spacing of one null beamwidth was taken into account in the foregoing mathematical analysis, and computation of the receiving grating lobe antenna array of FIGURE 7. Further, the only assumption made in this analysis is that an integral number of guide wavelengths exist between branch points of each waveguide when all frequencies are at the center or boresight value. It will be apparent, therefore, that the number of integers are not the same for each waveguide array.

*Mode of operation—FIGURE 1*

With reference to the block diagram of FIGURE 1 in view of the foregoing description of FIGURES 2–7, the operation of this first exemplary embodiment is as follows:

The transmitting elements 60, spaced on $d_T$ centers with each element connected through directional couplers 64 to a waveguide 62, produce a multilobe antenna pattern, such as is shown in FIGURE 3. As the transmit frequency $f_1$ developed by the MS 78, SPC 80 and MD 86, is varied over a range of frequencies $f_1^n$, the transmit antenna lobe pattern is rotated or steered angularly over a range of small angles, such as $\pm 2\frac{1}{2}$ degrees. If the transmitting elements 60 were used to receive as well as transmit, angular ambiguities would exist which would render it virtually impossible to determine in which grating lobe a target was located. Separate receiving elements 70 are, therefore, provided for resolving grating lobe ambiguities.

The receiving elements 70, spaced on $d_R$ centers with each connected through mixers 74 and directional couplers 76 to a waveguide 72, produce a multilobe antenna pattern, such as shown in FIGURE 2. By properly selecting the number of transmitting and receiving elements 60 and 70, respectively, and the distances between adjacent elements ($d_T$ and $d_R$), the separation of transmit lobes and receive lobes can be made so that only one transmit lobe and one receive lobe coincide at any one time. Since the overall or "round trip" antenna pattern is the product of the transmit and receive patterns, this special lobe spacing resolves the grating lobe ambiguities by producing a single lobed product pattern (see FIGURE 4).

In order to scan the sector between adjacent product lobe positions, it is necessary that the receive pattern track the transmit pattern as the transmit pattern is steered or varied. Thus, in order to point the product lobe in various discrete directions, it is necessary to rotate the receive pattern relative to the transmit pattern so that various combinations of transmit and receive lobe coincidence can be achieved. Accordingly, in order to achieve both receive pattern tracking and various transmit and receive lobe coincidence, the receive pattern must be steered independently of the transmit pattern. This is effectively achieved by utilizing mixers 74, which may be broad band mixers, at the port of each receiving element 70. Then, the output $f_2$ of the frequency controlled 1st L.O. 82 is coupled directly to each of the mixers 74 thereby causing the receive pattern to rotate as the 1st L.O. frequency is varied. The transmit frequency $f_1$ is then varied under control of the SPC 80, MD 86 and MS 78 so as to cause the product lobe to scan a first sector $\theta_S$ (see FIGURE 5). While the transmit frequency $f_1$ is varying, the frequency $f_2$ of the 1st L.O. 82 is also varied under control of the SPC 80 so as to maintain registration (i.e., $f_1-f_2$=constant) of the transmit and receive patterns and maintain grating lobe coincidence.

The signals (in this case the reflected transmit frequency) received by the antennae 70 are respectively delivered to the mixers 74 and mixed with the 1st L.O. frequency $f_2$ so as to develop a first intermediate frequency (1st I.F.) or difference frequency $f_3$. The 1st I.F. $f_3$ is then coupled to the 2nd mixer 108 via conductor 110 where it is mixed with the frequency developed by a 2nd L.O. 84 so as to develop a second intermediate frequency (2nd I.F.) $f_4$. The 2nd I.F. $f_4$ is then delivered to the 2nd I.F. Amp and AFCD 112. A portion of the 2nd I.F. $f_4$ is then amplified and coupled to conventional video and display circuits 115 (or to any desired signal utilization circuit) while the remaining portion of the 2nd I.F. $f_4$ is coupled to a conventional AFC discriminator circuit in the 2nd I.F. Amp and AFCD 112. The signal developed by the AFCD section of the 2nd I.F. Amp and AFCD 112 is then fed to an AFC circuit 118 wherein an AFC signal is developed for maintaining the frequency of the 2nd L.O. 84 at a desired value. The frequency of the 2nd L.O. 84 is, however, primarily controlled by the SPC 80. As mentioned above, the isolator 100 is included in the circuit for isolating the MS 78 from the variable impedance presented by the transmit antennas 60 as the transmit frequency $f_1$ varies. The terminating loads 117 and 119 prevent unwanted reflections of the signals traveling along the waveguides 62 and 72, respectively.

Figure 8:
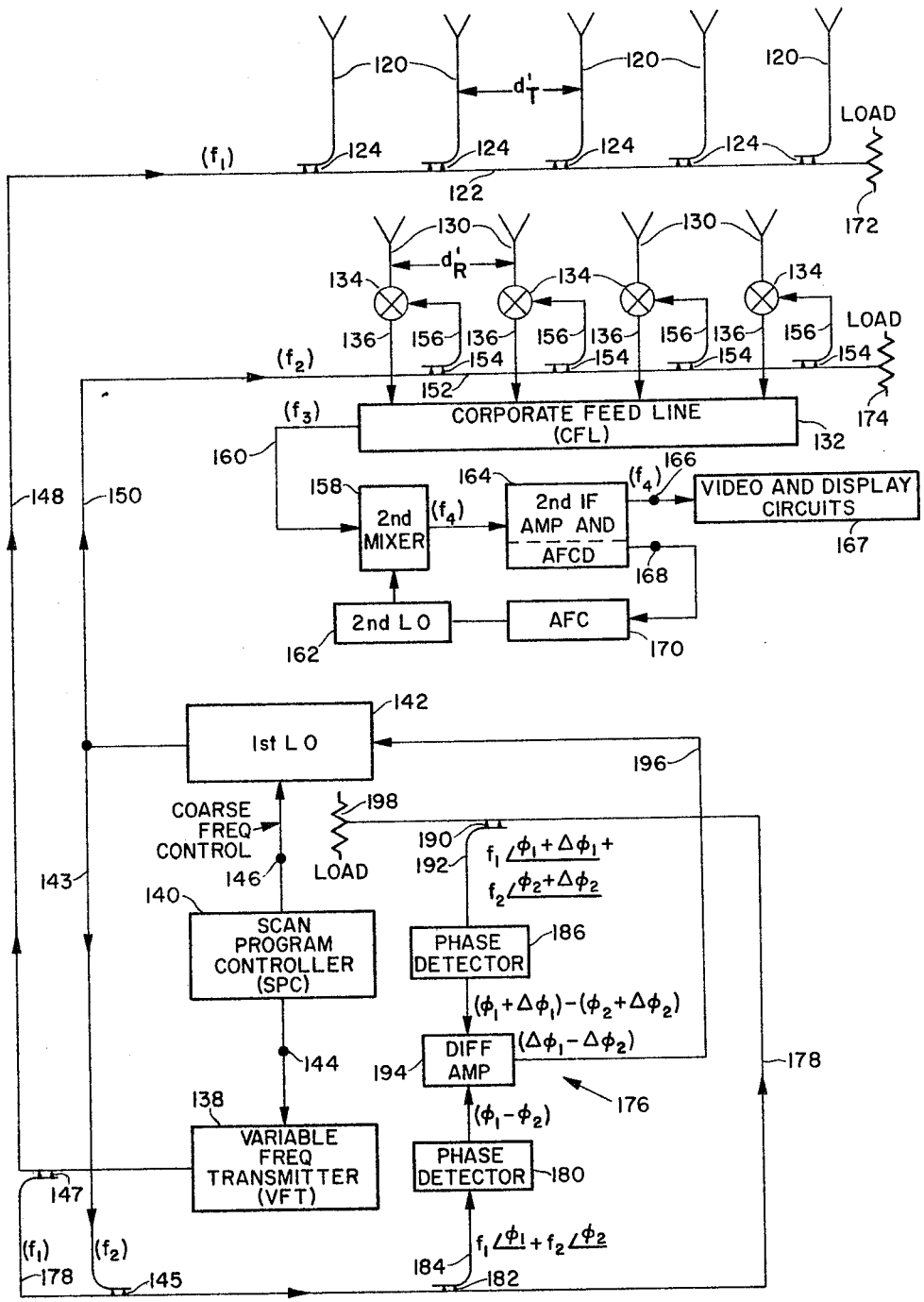
FIGURE 8 depicts a block diagram of another embodiment of the present invention.

*Detailed description—FIGURE 8*

Referring now to FIGURE 8, there is shown a block diagram of an alternate embodiment of the present invention. The transmitting elements 120 are each connected to a waveguide 122 by a directional coupler 124 and are separated by a distance $d_T^1$. The receiving elements 130 are each connected to a corporate feed line (CFL) 132 through a mixer 134 and conductor 136 and are separated by a distance $d_R^1$. As mentioned above in detail regarding the mathematical analysis of the transmitting and receiving arrays of FIGURES 6 and 7, the distances $d_T^1$ and $d_R^1$ are specially selected so as to provide a separation $\theta_{SR}$ (see FIGURE 2) between the receiving pattern grating lobes that is one null beamwidth less than the separation $\theta_{ST}$ (see FIGURE 3) between the transmitting pattern grating lobes. It should be noted that the transmitting and receiving antenna array of this embodiment also have a grating lobe pattern substantially the same as the grating lobe patterns of the antenna arrays of FIGURES 6 and 7.

A variable frequency transmitter (VFT) 138 is provided for generating a controlled, rapidly variable, transmit frequency $f_1$ which is sufficient to steer the transmit beam over an interval $\theta_S$ (see FIGURES 4 and 5). A scan program controller (SPC) 140 is provided for controlling the first local oscillator (1st L.O.) 142 and the VFT 138. The SPC 140 has two output terminals, 144 and 146. A voltage level signal from SPC 140 is applied to the VFT 138 through terminal 144 for controlling the transmit frequency $f_1$ of the VFT 138. A second voltage level signal from SPC 140 is applied to the 1st L.O. 142 via terminal 146 for establishing the frequency $f_2$ of the 1st L.O. 142.

The transmit frequency $f_1$ generated by the VFT 138 is applied to the transmitting elements 120 via directional coupler 147, conductor 148, waveguide 122, and directional couplers 124. It is to be understood, that if the VFT 138 is sensitive to its load (i.e., elements 120, waveguide 122 and couplers 124) any well known isolator circuit may be inserted for isolating the VFT 138 from the variable impedance presented by the transmitting section as the transmit frequency $f_1$ varies.

The frequency $f_2$ generated by the 1st L.O. 142 is applied to each of the mixers 134 via conductor 150, waveguide 152, directional couplers 154 and conductor 156.

The 1st L.O. frequency $f_2$ is then mixed with reflections of the transmit frequency $f_1$, which are received by the receiving elements 130 and also applied to each of the mixers 134, so as to develop a first intermediate frequency (1st I.F.) $f_3$. The 1st I.F. $f_3$ is coupled to the second mixer 158 via the CFL 132 and conductor 160. The frequency generated by the 2nd L.O. 162 is also applied to the 2nd mixer 158, which is tuned to pass a second intermediate frequency (2nd I.F.) $f_4$. The 2nd I.F. $f_4$ developed by the 2nd mixer 158 is applied to the second intermediate frequency amplifier and automatic frequency control discriminator (2nd I.F. Amp and AFCD) 164. The amplified 2nd I.F. $f_4$ may then be coupled to appropriate video and display circuits 167 via output terminal 166. The 2nd I.F. Amp and AFCD 164 is also develops a second output signal which is delivered via output terminal 168 to the automatic frequency control (AFC) circuit 170. The output signal of the AFC circuit 118 is then delivered to the 2nd L.O. 162 wherein it is used to establish and fine control the frequency generated by the 2nd L.O. 162. The circuit which includes the AFCD section of the 2nd I.F. Amp and AFCD 164, the AFC circuit 170, and the 2nd L.O. 162, constitute what is commonly referred to as an AFC "loop." It should be noted, that the waveguides 122 and 152 are respectively terminated by conventional resistive loads 172 and 174. As noted above with regard to the embodiment of FIGURE 1, other well known AFC loop circuits may be readily substituted without departing from the spirit and scope of the present invention. Also, well known voltage-controlled-frequency type oscillators, such as backward wave oscillators may be incorporated as the 1st and 2nd local oscillators if desired.

Referring now to the lower portion of FIGURE 8, there is shown a phase locked loop circuit, generally indicated at 176.

The transmit frequency $f_1$ generated by the VFT 138 is coupled to a reference waveguide 178 via directional coupler 147 while the frequency $f_2$ generated by the 1st L.O. 142 is coupled to the reference waveguide 178 via conductor 143 and directional coupler 145. The transmit and 1st L.O. frequencies $f_1$ and $f_2$ are simultaneously applied to a phase detector 180 via directional coupler 182 and conductor 184. These two frequencies ($f_1$ and $f_2$) are subsequently but simultaneously applied to a second phase detector 186 via waveguide 178, directional coupler 190 and conductor 192. The output signals of phase detectors 180 and 186 are each delivered to the Differential Amplifier (Diff. Amp.) 194. The output signal of the Diff. Amp. 194 is then coupled to the 1st L.O. 142 via conductor 196. It should be noted that the waveguide 178 is conventionally terminated by a resistive load 198. The terminating loads 172, 174 and 198 are included to prevent unwanted reflections of the signals traveling along the waveguides 122, 152 and 178, respectively.

*Mode of operation—FIGURE 8*

With reference to the block diagram of FIGURE 8 in view of FIGURES 2–7, the operation of this second exemplary embodiment is as follows:

The operation of the transmitting and receiving antenna arrays of this embodiment is similar in many respect to the operation of the antenna arrays of the embodiment of FIGURE 1. For example, the transmitting elements 120, spaced on $d_T{}^1$ centers with each element connected through directional couplers 124 to a waveguide 122, also produce a multilobe antenna pattern, such as shown in FIGURE 3. Further, as the transmit frequency $f_1$, developed by the VFT 138 and SPC 140, is varied over a range of frequencies, the transmit antenna lobe pattern (see FIGURE 3) is also rotated or steered angularly over a range of small angles, such as $\pm 2\frac{1}{2}$ degrees. If the transmitting elements 120 were used to receive as well as transmit, angular ambiguities would also exist which would render it virtually impossible to determine in which grating lobe a target was located. As in the embodiment of FIGURE 1, separate receiving elements 134 are provided for resolving grating lobe ambiguities. However, the receiving array of this embodiment varies from the receiving array of FIGURE 1 as follows:

The receiving elements 134, spaced on $d_R{}^1$ centers with each connected through mixers 134, conductors 156 and directional couplers 154 to a waveguide 152, produce a multilobe antenna pattern, such as shown in FIGURE 2. By properly selecting the number of transmitting and receiving elements 120 and 134 and the distances between adjacent elements ($d_T$ and $d_R$), the separation of transmit lobes and receiving lobes can be made so that only one transmit lobe and one receive lobe coincide at any one time. Since the overall or "round trip" antenna pattern is the product of the transmit and receive patterns, this special lobe spacing resolves the grating lobe ambiguities by producing a single lobed product pattern (see FIGURE 4). As mentioned above with regard to the embodiment of FIGURE 1, the receive pattern must be steered independently of the transmit pattern in order to achieve both receive pattern tracking and various transmit and receive lobe coincidence. This is effectively achieved by utilizing a mixer 134 at the port of each receiving element 130. Thus, by coupling the frequency $f_2$ generated by the 1st L.O. 142 to each of the mixers 134 through the waveguide 152, the receive pattern is caused to rotate as the 1st L.O. frequency $f_3$ is varied. Then, the transmit frequency $f_1$ is varied under control of the SPC 140 so as to cause the product lobe to scan a first sector $\theta_S$ (see FIGURE 5). While the transmit frequency $f_1$ is varying, the frequency $f_2$ of the 1st L.O. is varied under control of the SPC 140 and a phase locked loop circuit (discussed more fully below) so as to maintain registration (i.e., $f_1-f_2$=constant) of the transmit and receive patterns and maintain grating lobe coincidence.

The signals (reflected transmit frequency) received by the antennas 130 are respectively delivered to the mixers 134 and mixed with the 1st L.O. frequency $f_2$ so as to develop a first intermediate frequency (1st I.F.) or difference frequency $f_3$. The 1st I.F. $f_3$ from each mixer 134 is summed in the CFL 132 and coupled to the 2nd mixer 158 via conductor 160. The operation of the 2nd mixer 158, 2nd I.F. Amp and AFCD 164, 2nd L.O. 162, AFC 170, and Video and Display circuits 167, are substantially the same as above described in detail with regard to corresponding elements of the embodiment of FIGURE 1.

Precise receiving lobe tracking is accomplished by the incorporation of the phase locked loop circuit 176. While the transmit frequency $f_1$ is varying, the phase locked loop 176 maintains registration of the transmit and receiving patterns by deriving an error signal which is applied to the 1st L.O. 142 so as to vary the 1st L.O. frequency $f_2$ by the precise amount necessary to maintain grating lobe alignment or coincidence. The operation of the phase locked loop is as follows:

In order to maintain grating lobe alignment, the phase shift ($\Delta\phi_1$) experienced by the transmit frequency $f_1$ as it propagates down the reference waveguide 178 must be equal, within an integral multiple of $2\pi$, to the phase shift ($\Delta\phi_2$) experienced by the 1st L.O. frequency $f_2$ as it propagates down the reference waveguide 178. The transmit and 1st L.O. frequencies are fed first to phase detector 180, located electrically at the input of reference waveguide 178, and then to the phase detector 186, located electrically at the output of the reference waveguide 178. If we represent the transmit and 1st L.O. frequencies as $$(f_1 \underline{|\phi_1}) \text{ and } (f_2 \underline{|\phi_2})$$

respectively, as they are delivered to the waveguide input phase detector 180 and represent these frequencies as $$(f_1 \underline{|\phi_1+\Delta\phi_1}) \text{ and } (f_2 \underline{|\phi_2+\Delta\phi_2})$$

respectively, as they are delivered to the waveguide output phase detector 186, then the output of the differential amplifier 194, which represents a voltage output proportional to the difference of the outputs of the phase detectors 180 and 186, will be $(\Delta\phi_1-\Delta\phi_2)$. The voltage output of the differential amplifier 194, which constitutes an error voltage, is applied to the 1st L.O. 142 via conductor 196, thereby causing the frequency $f_2$ of the 1st L.O. 142 to vary until the phase differential $(\Delta\phi_1-\Delta\phi_2)$ of the transmit and 1st L.O. frequencies is driven to zero. The multiple of $2\pi$ phase difference which will then exist between $(\Delta\phi_1$ and $\Delta\phi_2)$ is related to the particular transmit and receive lobes which are aligned.

In addition, the physical distance of the reference waveguide 178 must be equal to one-half the product of the number of transmitting elements and the physical distance between the transmitting elements. That is to say, $$L_{RG}=\frac{N_T d_T}{2}=\frac{N_T d_R}{2}$$

where, $L_{RG}$=physical length of said third waveguide
$N_T$=number of said transmitting elements
$d_T$=physical distance between said transmitting elements
$N_R$=number of said receiving elements
$d_R$=physical distance between said receiving elements It will be apparent from the foregoing that the present invention provides a unique antenna system and technique for use in combination with radar and radio navigation networks which system has high angular and range resolution, operates in real time, provides forward looking capability, has minimum performance degradation under extreme atmospheric conditions and has minimum maintenance requirements.

The generation of controlled grating lobe structures in the transmitting antenna pattern which are incommensurate with the controlled grating lobe structures in the receiving antenna pattern uniquely provides reinforcement of the transmit and receive pattern only in the direction in which one transmit lobe coincides with one receive lobe so as to provide a single lobe product pattern.

Further, by successively varying local oscillator frequency, the receive pattern is caused to move relative to the transmit pattern so that the direction of reinforcement of the transmit and receive patterns is uniquely moved in discrete steps along the total sector being scanned whereas by varying transmit frequency the reinforced product lobe is caused to scan the sector between each successive reinforced product lobe position.

Further, by making the angular distance between any two adjacent receiving pattern grating lobes one main lobe null beamwidth different than the angular distance between any two transmitting pattern grating lobes the product pattern is uniquely reinforced only in the direction in which one of the transmitting lobes coincides with one of the receiving lobes.

For exemplary purposes only, the following parameters and performance data are included:

| | |
|---|---|
| Dimensions | 25 ft. x 3 in. x 12 in. |
| Weight | 100 lbs. (excluding attaching hardware). |
| Frequency | 16.5K mc. |
| Horizontal beamwidth | 1.8 milliradians. |
| Horizontal resolution | 1.5 milliradians. (3 db-two way). |
| Vertical beamwith | 15 degrees. |
| Gain | 28 db (one-way). |

While several embodiments of the present invention have been described in detail, it is to be understood that other modifications are contemplated which would be apparent to persons skilled in the art without departing from the spirit of the invention of the scope of the appended claims.

I claim:
1. An antenna scanning arrangement for use with transmit and receive antenna arrays:
   (a) said arrays each having antenna elements thereon;
   (b) said elements on each array being predeterminedly positioned so as to respectively create transmit and receive patterns each having a plurality of spaced grating lobes;
   (c) one of said patterns having a lobe spacing which is incommensurate with the lobe spacing of the other pattern;
   (d) means for selectively aligning a lobe of said one pattern with a lobe of said other pattern so as to produce an unambiguous product grating lobe pattern having a single reinforced grating lobe;
   (e) means for steering said reinforced lobe over an angular sector which is substantially smaller than the total area to be scanned; and
   (f) said aligning means including second steering means causing said product pattern to be reinforced at any predetermined pointing angle within said total area so that any angular sector within said total area may be scanned.

2. An antenna scanning arrangement in accordance with claim 1, wherein:
   (a) said second steering means is capable of causing said product pattern to successively reinforce at discrete pointing angles within said total areas so that successive angular sectors within said total area may be scanned.

3. An antenna scanning arrangement in accordance with claim 2, wherein:
   (a) the angular sections between adjacent pointing angles of said reinforced lobe or substantially equal; and
   (b) said angular sectors are substantially equal to said angular sections so that each successive reinforced lobe is caused to scan the area between adjacent pointing angles, whereby said total area is scanned by the successive scanning of said adjacent angular sections.

4. An antenna scanning arrangement in accordance with claim 3, wherein:
   (a) said lobe spacing of said one pattern is one main lobe null beamwidth different than said lobe spacing of said other pattern.

5. An antenna scanning arrangement for use with grating lobe transmit and receive antenna arrays:
   (a) said arrays being substantially parallel and each having a plurality of antenna elements thereon;
   (b) said elements on each array being spaced in a predetermined manner upon said arrays so as to respectively create transmit and receive patterns each having a plurality of spaced grating lobes;
   (c) said transmit pattern having a lobe spacing which is incommensurate with the lobe spacing of said receive pattern;
   (d) means for independently steering said transmit and receive patterns with respect to each other so as to bring only one lobe of each pattern into coincidence at one time, thereby eliminating grating lobe ambiguities at each pattern;
   (e) said steering means including means for successively aligning a selected lobe of said receive pattern with a selected lobe of said transmit pattern so as to produce an unambiguous product grating lobe pattern having a single reinforced grating lobe;
   (f) said steering means also including frequency steering means for steering any reinforced lobe over angular sector which is substantially smaller than the total angular area to be scanned; and
   (g) said aligning means including means for causing said product pattern to be reinforced at any pointing angle within said total area so that any desired angular sector within said total area may be scanned.

6. An antenna scanning system for use in combination with high resolution radar systems comprising:
   (a) transmit and receive antenna arrays with each array having a plurality of antenna elements thereon;
   (b) said elements on each array being predeterminedly positioned so as to respectively create transmit and receive patterns each having a plurality of spaced grating lobes;
   (c) said transmit pattern having a lobe spacing between any two adjacent lobes which is one main lobe null beamwidth different from the lobe spacing between any two adjacent receive lobes so that the product of said patterns reinforces only in the direction in which one of said transmit lobes coincides with one of said receive lobes;
   (d) first frequency generating means for generating a first frequency and coupled to said receive elements for aligning a preselected lobe of said receiving pattern with a preselected lobe of said transmit pattern so as to produce an unambiguous product grating lobe pattern having a single reinforced grating lobe;
   (e) second frequency generating means for generating a second frequency and coupled to said transmit elements for steering said reinforced lobe over an angular sector which is substantially smaller than the total area to be scanned;
   (f) frequency control means coupled to said first and second frequency generating means for controlling the frequencies thereof, whereby said product pattern may be reinforced at any predetermined pointing angle and said reinforced lobe caused to scan a preselected sector within said total area to be scanned.

7. An antenna scanning system in accordance with claim 6, wherein:
   (a) said frequency control means being capable of causing the frequency of said second frequency generating means to vary so that said product pattern may be successively reinforced at discrete pointing angles within said total area, whereby successive angular sectors within said total area may be scanned.

8. An antenna scanning system in accordance with claim 7, wherein:
   (a) the angular sections between adjacent pointing angles of said reinforced lobe are substantially equal; and
   (b) said angular sectors are substantially equal to said angular sections so that each successive reinforced lobe is caused to scan the area between adjacent pointing angles, whereby said total area is scanned by the successive scanning of said adjacent angular sections.

9. An antenna scanning system in accordance with claim 8, wherein:
   (a) said second generating means comprising a hydralically tuned magnetron and servo circuit for generating said second frequency, and a modulator and driver circuit for establishing the frequency of said magnetron and servo circuit; and
   (b) said frequency control means develops at least three control signals, one signal for controlling said modulator and driver circuit, one signal for causing said magnetron and servo circuit to sweep over a predetermined range of frequencies so that said reinforced lobe is caused to scan said angular sector, and one signal for successively varying the frequency of said first generator so that said product pattern may be successively reinforced at discrete pointing angles within said total area to be scanned.

10. An antenna scanning system in accordance with claim 8, wherein:
    (a) said frequency control means develops at least two control signals, one signal for establishing the frequency of said second generator and for causing said second generator to sweep over a predetermined range of frequencies so that said reinforced lobe is caused to scan said angular sector, and one signal for successively varying the frequency of said first generator so that said product pattern may be successively reinforced at discrete pointing angles within said total area to be scanned; and
    (b) phase lock loop means coupled to said first and second generators for shifting the frequency of said first generator with respect to said frequency sweep of said second generator so as to maintain a given relationship between the frequencies of said first and second generators while said second generator is sweeping over said predetermined range of frequencies and between said successive shifting of the frequency of said first generator.

11. An antenna scanning system in accordance with claim 10, wherein:
    (a) said phase lock means comprises a waveguide having an input and output, first and second phase detectors each having an input and output, and a differential amplifier having two inputs and an output;
    (b) said first and second frequencies being coupled to said input of said waveguide;
    (c) said first and second phase detectors being respectively connected between said input and output of said waveguide and one input of said differential amplifier for developing a control voltage;
    (d) said control voltage being coupled to said first generator for shifting said second frequency substantially proportional with respect to said frequency sweep of said second generator.

12. An antenna system in accordance with claim 11, wherein:
    (a) the physical length of said waveguide is represented by the expression, $$L_{RG}=N_T d_T/2 = N_R d_R/2$$

where, $L_{RG}$=physical length of said waveguide,
    $N_T$=number of said transmit elements,
    $d_T$=physical distance between said transmit elements,
    $N_T$=number of said receive elements,
    $d_T$=physical distance between said receive elements.

13. An antenna scanning system for use in combination with high resolution radar systems, comprising:
    (a) a plurality of transmit antenna elements for transmitting a first frequency;
    (b) a plurality of receive antenna elements arranged in parallel relationship with said transmitting elements for receiving reflections of said transmitted first frequency which contains intelligence;
    (c) said transmit and receive elements being physically positioned and having predetermined electrical characteristics so as to respectively create transmit and receive patterns, each having a plurality of spaced grating lobes with the angle between any two adjacent receive lobes being one main lobe null beamwidth different than the angle between any two adjacent transmit lobes so that the product of said transmit and receive patterns reinforces only in the direction in which one of said transmit lobes coincides with one of said receive lobes, thereby producing an unambiguous product grating lobe pattern having a single reinforced grating lobe;
    (d) a first frequence generator coupled to said transmit elements for generating said first frequency;
    (e) first coupling means for coupling said first frequency generator to each of said transmit elements;
    (f) a second frequency generator coupled to said receive elements for generating a second frequency;

(g) a plurality of mixers respectively coupled to said receive elements;
(h) second coupling means for respectively coupling said second frequency from said second generator to said mixers;
(i) said mixers being adapted to mix said reflections of said first frequency, which are received by said receive elements, and said second frequency, which is generated by said second generator, so as to develop a third frequency;
(j) a program controller coupled to said second generator for successively shifting said second frequency relative to said first frequency so that a preselected receive lobe coincides with a preselected transmit lobe, thereby causing said reinforced lobe to successively moved in discrete angular steps along a total angular area to be scanned;
(k) said program controller being also coupled to said first generator for causing said first frequency to sweep over a predetermined range of frequencies so that said reinforced lobe will scan the angular sector between each successive position of said reinforced lobe;
(l) said program controller being also adapted to shift the frequency of said second generator proportionally with respect to said frequency sweep of said first generator so as to maintain a given relationship between said first and second frequencies while said first frequency is sweeping over said predetermined range of frequencies;
(m) display means for developing a fourth frequency and displaying the intelligence carried by said fourth frequency; and
(n) third coupling means for coupling said third frequency, which is developed by said plurality of mixers, to said display means.

14. An antenna scanning system in accordance with claim 13, wherein:
(a) said first frequency generator comprises a hydraulically tuned magnetron and servo circuit for generating said first frequency and a modulator and driver circuit for establishing the frequency of said magnetron and servo circuit;
(b) said first coupling means comprises a waveguide coupled between said frequency generator and each of said transmit elements;
(c) said third coupling means comprises a second waveguide coupled between said display means and each of said receive elements; and
(d) said program controller develops at least three output signals, one signal for controlling said modulator and driver circuit, one signal for causing said magnetron and servo circuit to sweep over said predetermined range of frequencies, and one signal for establishing the frequency of said second generator and for causing said second frequency to successively shift relative to said first frequency between said sweeps of said first frequency and to proportionally shift with respect to said first frequency during said sweeps of said first frequency.

15. An antenna scanning system for use in combination with high resolution radar systems, comprising:
(a) a plurality of transmitting antenna elements for transmitting a first frequency;
(b) a plurality of receiving antenna elements arranged in parallel relationship with said transmitting elements for receiving reflections of said transmitted first frequency which contain intelligence;
(c) said transmit and receive elements being physically spaced and having electrical characteristics so as to respectively create transmit and receive patterns having a plurality of spaced grating lobes with the angular distance between any two adjacent receive lobes being one main lobe null beamwidth different than the angular distance between any two adjacent transmit lobes so that the product of the transmit and receive patterns reinforces only in the direction in which one of said transmit lobes coincides with one of said receive lobes so as to produce an unambiguous product grating lobe pattern having a single reinforced grating lobe;
(d) a first frequency generator coupled to said transmit elements for generating said first frequency;
(e) first coupling means for coupling said first frequency from said frequency generator to said transmit elements;
(f) a second frequency generator coupled to said receive elements for generating a second frequency;
(g) a plurality of mixers respectively coupled to said receive elements;
(h) second coupling means for respectively coupling said second frequency from said second generator to said mixers;
(i) said mixers being adapted to mix said reflections of said first frequency, which are received by said receive elements, and said second frequency, which is generated by said second generator, so as to develop a third frequency;
(j) a program controller coupled to said second generator for successively shifting said second frequency relative to said first frequency so that a preselected receive lobe coincides with a preselected transmit lobe, thereby causing said reinforced lobe to be successively moved in discrete angular steps along a total area to be scanned;
(k) said program controller being also coupled to said first generator for causing said first frequency to sweep over a predetermined range of frequencies so that said reinforced lobe will scan the angular sector between each successive position of said reinforced lobe;
(l) phase lock loop means coupled to said first and second generators for shifting the frequency of said second generator with respect to said frequency sweep of said first generator so as to maintain a given relationship between said first and second frequencies while said first frequency is sweeping over said predetermined range of frequencies;
(m) display means for developing a fourth frequency and displaying the intelligence carried by said fourth frequency; and
(n) third coupling means for coupling said third frequency, which is developed by said plurality of mixers, to said display means.

16. An antenna scanning system in accordance with claim 15, wherein:
(a) said first frequency generator comprises a variable frequency transmitter for generating said first frequency;
(b) said first coupling means comprises a waveguide coupled between said frequency transmitter and each of said transmit elements;
(c) said second coupling means comprises a second waveguide coupled between said second generator and each of said receive elements;
(d) said third coupling means comprises a corporate feed line coupled between each of said mixers and said display means;
(e) said program controller develops at least two output signals, one signal for establishing the frequency of said frequency transmitter and for causing said frequency transmitter to sweep over said predetermined range of frequencies, and one signal for establishing the frequency of said second generator and for causing said second frequency to successively shift relative to said first frequency between said sweeps of said first frequency and to proportionally shift with respect to said first frequency during said sweeps of said first frequency.

17. An antenna system in accordance with claim 16, wherein:
  (a) said receive elements are interdigitated and coaxial with said transmit elements;
  (b) said first and second waveguides are respectively coupled to each of said transmit and receive elements by directional couplers.

18. An antenna scanning method for use with transmit and receive antenna arrays having a plurality of antenna elements thereon, comprising the steps of:
  (a) developing transmit and receive patterns each having a plurality of spaced grating lobes with the lobe spacing of one pattern incommensurate with the lobe spacing of the other pattern;
  (b) aligning a lobe of said one pattern with a lobe of said other pattern so as to produce an unambiguous product grating lobe pattern having a single reinforced grating lobe;
  (c) steering said reinforced lobe over an angular sector which is substantially smaller than the total area to be scanned; and
  (d) steering said transmit and receive patterns so as to cause said product pattern to be reinforced at any predetermined pointing angle within said total area so that any angular sector within said total area may be scanned.

19. An antenna scanning method in accordance with claim 18, wherein:
  (a) said transmit and receive patterns are steered so as to cause said product pattern to successively reinforce at discrete pointing angles within said total area so that successive angular sectors within said total area may be scanned.

20. An antenna scanning method in accordance with claim 19, wherein:
  (a) said transmit and receive patterns are steered so as to cause said product pattern to successively reinforce at equal discrete pointing angles within said total area so that each successive reinforced lobe is caused to scan substantially the entire section between adjacent pointing angles, whereby said total area is scanned by the successive scanning of said adjacent angular sections.

21. An antenna scanning method for use with high resolution radar systems having transmit and receive antenna arrays with each array having a plurality of antenna elements thereon, comprising the steps of:
  (a) developing transmit and receive patterns each having a plurality of spaced grating lobes with the lobe spacing between any two adjacent transmit lobes being one main lobe null beamwidth different from the lobe spacing between any two adjacent receive lobes so that the product of said patterns reinforces only in the direction in which one of said transmit lobes coincides with one of said receive lobes;
  (b) generating a first frequency and coupling said first frequency to said receive elements for aligning a preselected receive lobe with a preselected transmit lobe so as to produce an unambiguous product pattern having a single reinforced grating lobe;
  (c) generating a second frequency and coupling said second frequency to said transmit elements for steering said reinforced lobe over an angular sector which is substantially smaller than the total angular area to be scanned;
  (d) controlling the frequency of said first and second frequencies so as to cause said product pattern to be reinforced at any predetermined pointing angle and to cause said reinforced lobe to scan a preselected angular sector within said total angular area to be scanned.

22. An antenna scanning method in accordance with claim 21, wherein:
  (a) said first and second frequencies are controlled so as to cause said product pattern to successively reinforce at discrete pointing angles within said total angular area so that successive angular sectors within said total angular area may be scanned.

23. An antenna scanning method in accordance with claim 21, wherein:
  (a) said first and second frequencies are controlled so as to cause said product pattern to successively reinforce at equal discrete pointing angles within said total angular area so that each successive reinforced lobe is caused to scan substantially the entire angular section between adjacent pointing angles, whereby said total angular area is scanned by the successive scanning of said adjacent angular section.

References Cited by the Examiner

UNITED STATES PATENTS 2,990,544  6/1961  La Rosa _____ 343—16 X
3,072,903  1/1963  Meyer.

CHESTER L. JUSTUS, *Primary Examiner.*

H. C. WAMSLEY, *Assistant Examiner.*